(12) United States Patent
Farjad-rad

(10) Patent No.: US 8,085,880 B2
(45) Date of Patent: Dec. 27, 2011

(54) AMPLITUDE MONITOR FOR HIGH-SPEED SIGNALS

(75) Inventor: Ramin Farjad-rad, Mountain View, CA (US)

(73) Assignee: RAMBUS Inc., Sunnyvale, CA (US)

( * ) Notice: Subject to any disclaimer, the term of this patent is extended or adjusted under 35 U.S.C. 154(b) by 1168 days.

(21) Appl. No.: 11/021,262

(22) Filed: Dec. 23, 2004

(65) Prior Publication Data

US 2006/0140318 A1  Jun. 29, 2006

(51) Int. Cl.
*H03D 3/22* (2006.01)

(52) U.S. Cl. ........ 375/332; 375/354; 375/316; 375/317; 375/357

(58) Field of Classification Search .................. 375/355, 375/354, 316, 317, 357
See application file for complete search history.

(56) References Cited

U.S. PATENT DOCUMENTS

| | | | |
|---|---|---|---|
| 5,563,893 A * | 10/1996 | Lai | 714/709 |
| 5,852,630 A * | 12/1998 | Langberg et al. | 375/219 |
| 5,926,047 A * | 7/1999 | Harrison | 327/159 |
| 6,377,082 B1 | 4/2002 | Loinaz et al. | |
| 6,438,178 B1 * | 8/2002 | Lysdal et al. | 375/317 |
| 6,489,803 B1 * | 12/2002 | Steiner et al. | 326/31 |
| 6,623,185 B1 | 9/2003 | Peragine | |
| 6,710,605 B2 | 3/2004 | Tang et al. | |
| 6,713,749 B2 | 3/2004 | Wu et al. | |
| 7,088,976 B2 * | 8/2006 | Gregorius et al. | 455/260 |
| 7,127,022 B1 * | 10/2006 | Dieguez | 375/375 |
| 7,184,477 B2 * | 2/2007 | Haunstein et al. | 375/233 |
| 7,639,736 B2 * | 12/2009 | Farjad-rad | 375/232 |
| 7,643,583 B1 * | 1/2010 | Savoj et al. | 375/340 |
| 2003/0164724 A1 * | 9/2003 | Momtaz et al. | 327/165 |
| 2004/0022339 A1 * | 2/2004 | Nakao | 375/376 |
| 2004/0066867 A1 * | 4/2004 | Fujimori et al. | 375/348 |
| 2004/0203559 A1 * | 10/2004 | Stojanovic et al. | 455/403 |
| 2005/0058234 A1 * | 3/2005 | Stojanovic | 375/371 |
| 2005/0238093 A1 * | 10/2005 | Payne et al. | 375/224 |
| 2005/0238126 A1 * | 10/2005 | Ribo et al. | 375/355 |
| 2005/0259764 A1 * | 11/2005 | Hung Lai et al. | 375/317 |
| 2008/0037594 A1 * | 2/2008 | Hornbuckle et al. | 370/537 |

OTHER PUBLICATIONS

Dally, William J. et al., "Transmitter Equalization for 4Gb/s Signalling." 11 pages. IEEE Micro, vol. 17, No. 1, 1997.
Yoo, Kwisung et al., "A Low Power CMOS Adaptive Line Equalizer for Fast Ethernet." Department of Electrical and Electronic Engineering, Yonsei University. Aug. 7. 2002. 4 pages.

(Continued)

*Primary Examiner* — Kenneth Lam

(57) ABSTRACT

A serial communication system includes a receiver that incorporates an amplitude monitor, which may be used to set and maintain appropriate termination-resistance values and transmit pre-emphasis and receive equalization settings. The amplitude monitor can note the presence or absence of input signals, as is required by some communication standards, such as those that require support for "out-of-band" (OOB) signaling for e.g. rate negotiation. The amplitude monitor compares the input signal with a reference level in response to a sample clock. The sample clock is periodically phase shifted with respect to the incoming data so the amplitude monitor is sure to sample an incoming data eye at or near the peak amplitude over a selected sample period. The amplitude detector notes the detection of an input signal if the input signal surpasses the reference level for any sample phase. The amplitude monitor experiments with different sample-clock phases over a number of data symbols, but is capable of measuring amplitude fast enough to resolve amplitude-based signals used for rate negotiation.

37 Claims, 5 Drawing Sheets

OTHER PUBLICATIONS

Gotoh, Kohtaroh et al., "A 2-byte Parallel 1.25 Gb/s Interconnect I/O Interface with Self-configurable Link and Plesiochronous Clocking." Fujitsu Sci. Tech. J., 36, 1, pp. 82-90, Jun. 2000.

Sohn, Young-Soo et al., "A 1.35Gbps Decision Feedback Equalizing Receiver for the SSTL SDRAM Interface with 2X Over-Sampling Phase Detector for Skew Compensation between Clock and Data," ESSCIRC 2002, pp. 787-790.

Sim, Jae-Yoon et al., "840 Mb/s CMOS Demultiplexed Equalizing Transceiver for DRAM-to-Processor Communication." 1999 Symposium on VLSI Circuits Digest of Technical Papers, pp. 23 & 24.

Duncan, Kevin, "Fibre Channel and Gigabit Ethernet: A Look at Technology for Storage Networking Solutions." University of Minnesota Fibre Channel Group. May 14, 2001. 42 p.

* cited by examiner

AMPLITUDE MONITOR FOR HIGH-SPEED SIGNALS

FIELD OF THE INVENTION

The present invention relates generally to the field of communications, and more particularly to high speed electronic signaling within and between integrated circuit devices.

BACKGROUND

Accurate amplitude measurement of multi-GHz AC signals and multi-Gbps random data patterns is challenging, especially if the measurement must be performed in a short time and without a sampling clock phase aligned to the incoming data signal. Conventional methods for amplitude measurement typically rectify or square the incoming signal to produce a DC component whose value represents signal amplitude. The DC component of the rectified or squared signal is extracted using a low-pass filter and is measured by an analog-to-digital converter or a simple comparator. Such approaches suffer from two main drawbacks: first the low-pass filtering of the rectified output can take a relatively long time to settle to an accurate value in response to amplitude changes; second, the accuracy of such approaches requires the use of rectifier or squarer stages that run at very high power to provide effective bandwidths well above the maximum input signal frequency. There is therefore a need for accurate, efficient, means of measuring the amplitude of high-speed signals.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
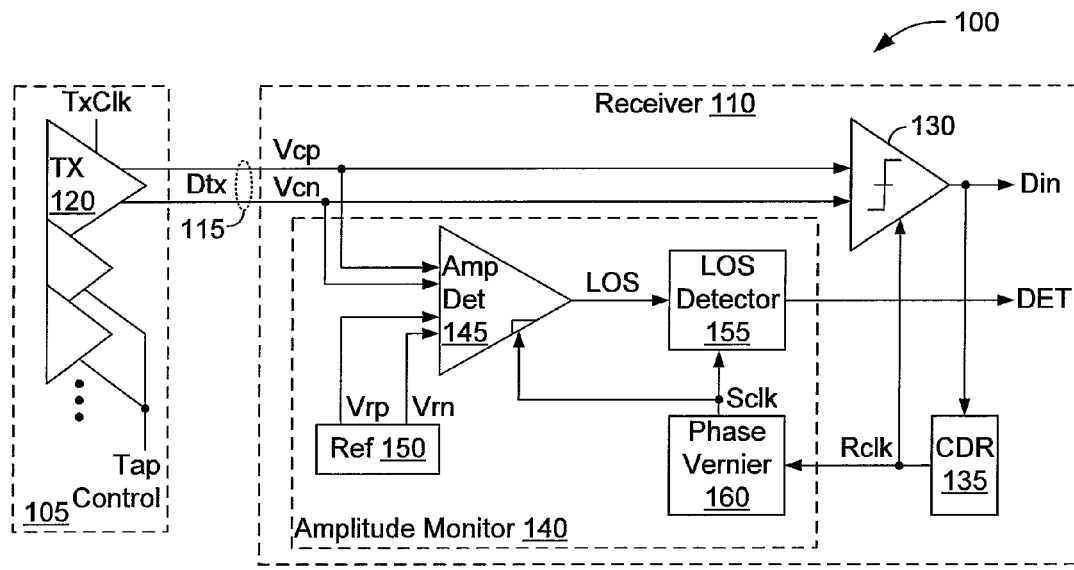
FIG. 1 depicts a communication system 100 in accordance with one embodiment.

FIG. 1 depicts a communication system 100 in accordance with one embodiment. System 100 includes a transmitter 105 that transmits a differential data signal Dtx, expressed as modulated voltages Vcp/Vcn, synchronized with a transmit clock signal TxClk, to the input port of a receiver 110 via a differential channel 115. A conventional transmitter may be employed as transmitter 105, so a detailed treatment is omitted here for brevity. Transmitter 105 optionally includes transmit pre-emphasis circuitry to dynamically adjust the data signal Dtx to reduce signal distortion caused by the effects of channel 115. Such transmit pre-emphasis circuitry may include, for example, a multi-tap transmit amplifier 120 adapted to cause the voltage amplitudes of the data symbols of signal Dtx to be selectively increased or decreased based on the data values of pre and/or post cursor data symbols.

Receiver 110 includes a sampler 130 and some clock-and-data recovery (CDR) circuitry 135, both of which are conventional for some types of serial receivers. CDR circuitry 135 recovers the timing of the incoming data. Sampler 130 employs the resulting recovered clock signal Rclk to sample the incoming data. Also included in receiver 110 is an amplitude monitor 140 that can be used to advantage in conjunction with any number of well-known data recovery schemes. A detailed discussion of sampler 130 and CDR 135 is not needed to illuminate the present invention, and is therefore omitted. Exemplary sampling and CDR circuitry is described, however, in "0.622-8.0 Gbps 150 mW Serial IO Macrocell with Fully Flexible Preemphasis and Equalization," by Ramin Farjad-Rad, et al. (2003 Symposium on VLSI Circuits Digest of Technical Papers), which is incorporated herein by reference.

A number of communication standards require compliant systems be capable of noting the presence or absence of input signals. Such standards include Fibre Channel, Serial ATA (SATA) and Serial Attached SCSI (SAS), each of which specifies an input-signal threshold for detecting a "loss-of-signal" (LOS) condition. The Fibre Channel standard does not clearly specify absolute threshold values, but instead provides as an upper bound the minimum specified receiver sensitivity and as a lower bound the noise level upon the complete removal of the connector associated with a channel. In an embodiment of receiver 110 for which the minimum threshold is 80 mV differential, amplitude monitor 140 is conservatively designed to indicate a loss-of-signal condition based upon an upper threshold of 150 mV and a lower threshold of 50 mV. The following table shows the thresholds for three exemplary standards:

TABLE 1

| LOS Thresholds | | |
| --- | --- | --- |
| Standard | Lower Threshold | Upper Threshold |
| SATA | 120 mV | 240 mV |
| SAS | 50 mV | 200 mV |
| Fibre Channel | 50 mV | 150 mV |

The amplitude of input-port voltage Vcp/Vcn is a useful measure of signal quality at the input of receiver 110. Signal amplitude may be used, for example, in setting and maintaining appropriate termination-resistance values and transmit pre-emphasis and receive equalization settings. Amplitude monitor 140 is therefore adapted, in some embodiments, to measure the amplitude of the incoming voltage Vcp/Vcn. In an example discussed below in connection with FIG. 3, amplitude monitor 140 can measure differential signal amplitudes in 50 mV differential steps (25 mV single-ended steps) up to 350 mV. The range and granularity of these measurements can be altered as needed.

The need for an amplitude monitor also arises in communication schemes that employ "out-of-band" (OOB) signaling. Such systems, typically high-speed transmitter/receiver pairs, communicate at relatively low speeds for e.g. rate negotiation, after which the pairs communicate at an agreed upon higher rate. In some OOB schemes, the transmitter sends random data patterns in which information is encoded in the absolute amplitude of the signal. For example, a data pattern in which the symbols have a symbol amplitude above some predetermined threshold is considered a logic one, and a data pattern in which the symbols have an amplitude below the same or another threshold is considered logic zero. The output of amplitude monitor 140 supports OOB signaling.

OOB rate negotiation occurs before the transmitter/receiver pair has negotiated a rate, and may occur before CDR 135 has an opportunity to lock recovered clock Rclk to the incoming data. Amplitude monitor 140 is therefore adapted to detect the signal amplitude of voltage Vcp/Vcn irrespective of whether recovered clock Rclk is in phase with the incoming data signal. Also important, amplitude monitor 140 can detect the presence or absence of signals fast enough to resolve amplitude-based signals used for rate negotiation. As used herein, the term "recovered clock signal" is used without regard to whether signal Rclk is locked to the incoming data.

Amplitude monitor 140 includes an amplitude detector 145, a voltage reference 150, a loss-of-signal (LOS) detector 155, and a phase vernier 160. Amplitude detector 145 periodically compares input-port voltage Vcp/Vcn to a differential reference signal Vrp/Vrn from voltage reference 150. Amplitude detector 145 generates a loss-of-signal signal LOS when the absolute value of the amplitude of differential voltage Vcp/Vcn in its input port is less then the amplitude of voltage reference Vrp/Vrn on its reference port. LOS detector 155 monitors signal LOS over a sample period and asserts a signal detect signal DET if signal LOS goes to zero over the sample period, indicating the presence of an input signal Dtx having an amplitude above the threshold voltage.

Phase vernier 160 derives a scan clock Sclk from recovered clock Rclk. Recovered clock Rclk is not necessarily locked with respect to the input data signal when amplitude monitor 140 is in use, so phase vernier 160 scans the phase of scan clock Sclk with respect to recovered clock Rclk to ensure at least one incoming data symbol is sampled at or near the peak symbol amplitude. Other embodiments use other means of generating sample clock Sclk. For example, phase vernier might use an on- or off-chip reference clock signal in lieu of the recovered clock signal, or phase vernier 160 might be omitted in favor of a separate clock source producing a frequency slightly different from the data rate of the expected input signal.

Figure 2:
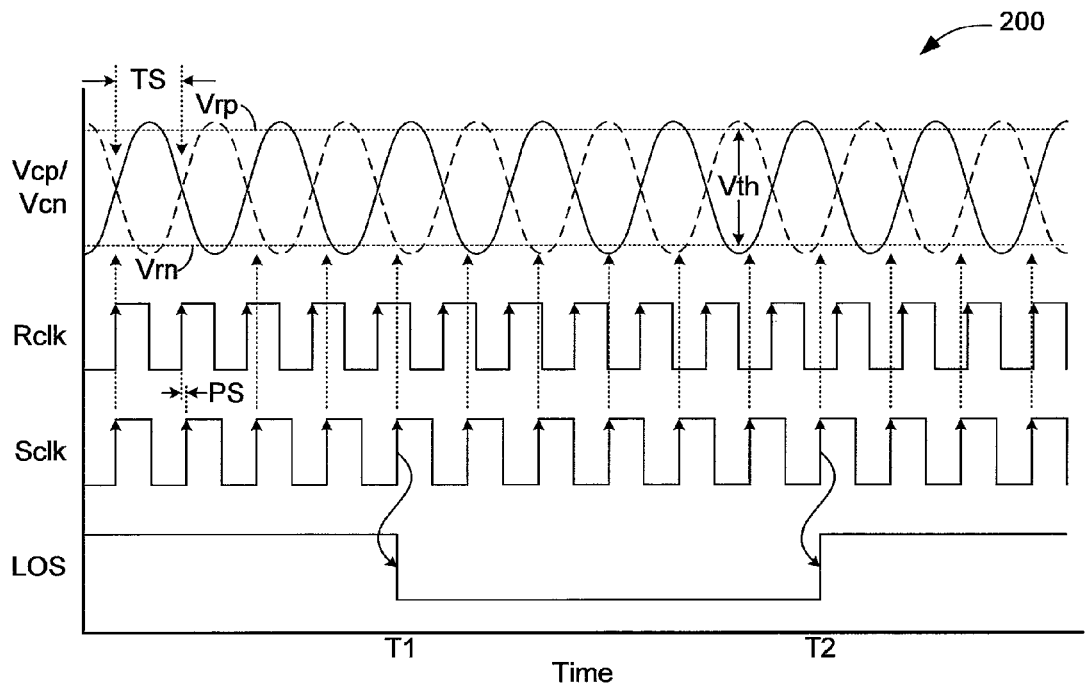
FIG. 2 is a waveform diagram 200 depicting the operation of amplitude monitor 140 in accordance with an exemplary embodiment.

FIG. 2 is a waveform diagram 200 depicting the operation of amplitude monitor 140 in accordance with one embodiment. As noted above, amplitude monitor 140 may be required to measure symbol amplitude at times during which recovered clock Rclk is not locked to input signal Dtx. Such a predicament is illustrated in FIG. 2, in which case the rising edges of recovered clock Rclk (presumed here to define the data sample timing of sampler 130), are approximately coincident with the symbol transitions of input signal Dtx. Scan clock Sclk is based upon recovered clock Rclk in this embodiment, but introduces a phase shift PS for each data-clock cycle, the result being that the rising edges of sample clock Sclk occur at progressively later sample instants with respect to recovered clock Rclk, and consequently with respect to the data symbols of input signal Dtx.

Starting from the left in the illustration of FIG. 2, the sample instants defined by rising edges of sample clock Sclk move closer to the respective data-eye center with each successive clock cycle. At time T1, the sample instant is such that the eye amplitude exceeds a threshold voltage Vth, which is in this case the difference between reference voltage levels Vrp and Vrn. Amplitude detector 145 therefore brings loss-of-signal node LOS low, indicating the presence of an input signal. Node LOS remains low until time T2, the sample instant at which the eye amplitude is once again less than threshold voltage Vth. In the depicted embodiment, the incremental phase shift PS is about one-sixteenth the duration of one symbol period, and amplitude monitor 140 explores sixteen different sample timing relationships over sixteen consecutive input symbols.

In the absence of any input signal, node LOS should remain high irrespective of sample clock timing. In that case, the output node DET of LOS detector 155 remains low, indicating the absence of an input signal. The presence of an input signal is detected if signal LOS transitions low for even one symbol. LOS detector 155 thus raises node DET to a logic one, signaling a detected signal, if signal LOS transitions low at any time over a sample period. In this example, one sample period is sixteen data symbols, so signal DET remains high so long as signal LOS transitions low at least once over sixteen symbol times TS.

Figure 3:
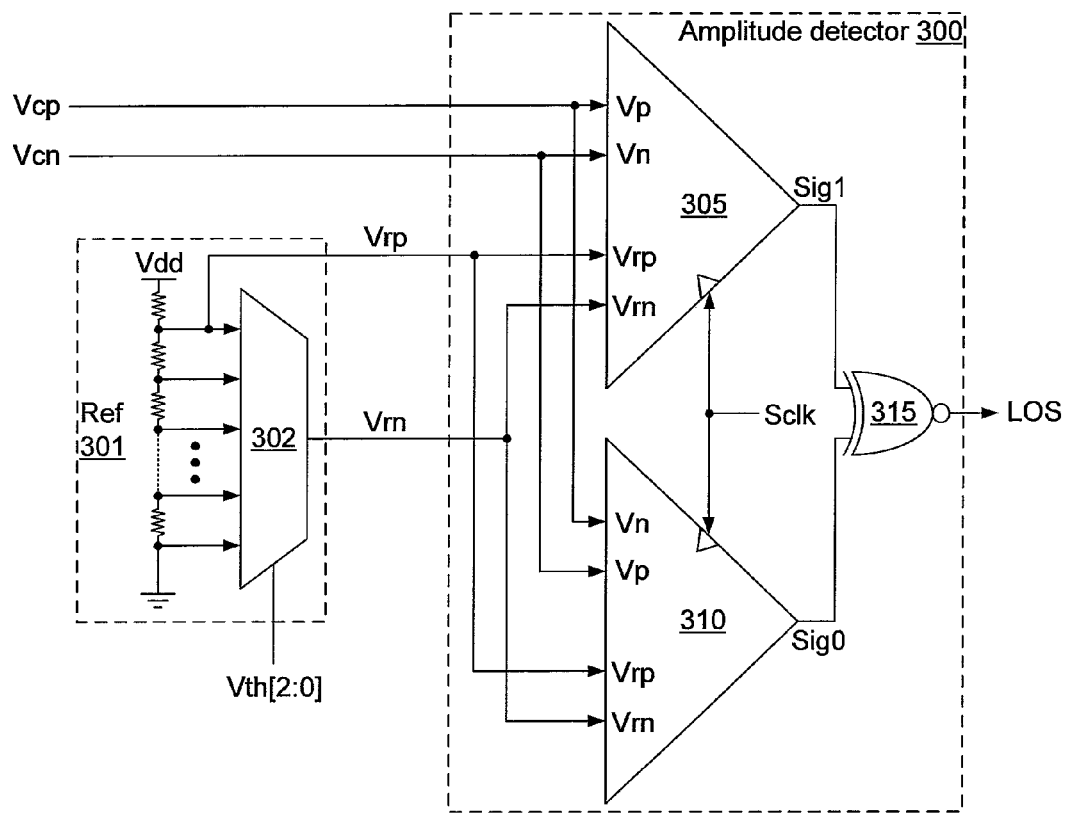
FIG. 3 details embodiments of amplitude detector 145 and voltage reference 150.

FIG. 3 details an amplitude detector 300 and voltage reference 301 that can be used in place of respective amplitude detector 145 and voltage reference 150 of FIG. 1. Voltage reference 301 is a digital-to-analog converter (DAC) comprising a multiplexer 302 with input terminals coupled to nodes of a voltage-divider network and select terminals coupled to a digital expression of a threshold voltage Vth[2:0]. Voltage reference 301 can provide eight different differential voltages Vrp/Vrn by providing appropriate three-bit binary values on select lines Vth[2:0]. The threshold can thus be adjusted, such as to comply with a given standard. Alternatively, symbol amplitude can be measured by adjusting the threshold voltage and measuring the resultant output of signal detector 140. The value presented on select lines Vth[2:0] can be incremented, for example, in the presence of an input signal until a loss-of-signal is detected, marking the threshold value at which differential voltage Vrp/Vrn is less than the input signal amplitude.

Amplitude detector 300 includes a pair of samplers 305 and 310 with outputs logically combined via a XNOR gate 315. Sampler 305 produces a logic one output signal Sig1 when the sampled difference between voltages Vcp and Vcn is positive and is greater than the threshold (i.e., Vcp−Vrn>Vrp−Vrn): sampler 310 produces a logic one output signal Sig0 when the sampled difference between voltages Vcn and Vcp is negative but the absolute value of the difference exceeds the threshold. XNOR gate 315 brings loss-of-signal node LOS low when either sampler 305 or 310 detects an incoming signal. Signal LOS therefore goes to zero, indicating signal presence, when the absolute value of the difference between voltages Vcp and Vcn is greater than Vrp−Vrn.

Figure 4:
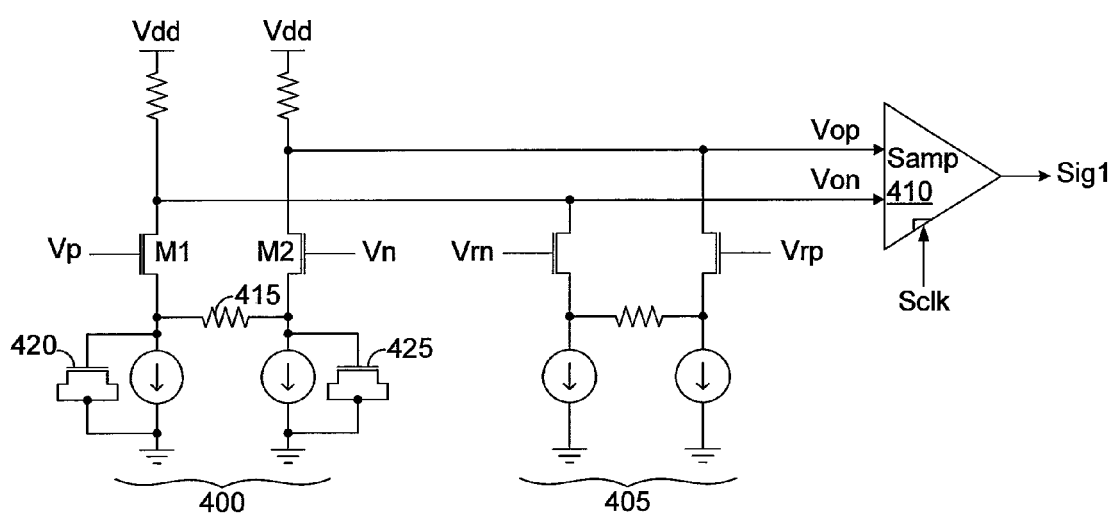
FIG. 4 details an embodiment of sampler 305 of FIG. 3.

FIG. 4 details an embodiment of sampler 305 of FIG. 3. (Sampler 310 may be identical, so a detailed discussion is omitted for brevity.) Sampler 305 includes a pair of differential current-steering networks 400 and 405 sharing a common load. Common output nodes Von and Vop from networks 400 and 405 are coupled to differential input terminals of a conventional sampler 410.

In the absence of an input signal Dtx, reference terminals Vrn and Vrp dictate the levels on terminals Vop and Von, and consequently the output from sampler 410. Assuming, as in the embodiment of FIG. 3, that Vrp is greater than Vrn, the voltage level on node Vop is less than the voltage level on node Von and the output of sampler 410 is low (i.e., Sig1=0). Signal Sig1 will go high when leg 400 overpowers leg 405.

The threshold levels Vrn and Vrp are DC levels in the depicted embodiment; in contrast, the differential input signals may be switching at high speeds. The communication channel from which sampler 305 obtains data may exhibit a low-pass filter effect, in which case the amplitudes of incoming symbols may therefore vary depending upon the spectral content of the symbols. Current-steering network 400 is therefore adapted to equalize incoming data.

Current-steering network 400 includes a pair of differential input transistors M1 and M2. Source degeneration is provided by a resistor 415 and a pair of capacitor-coupled transistors 420 and 425. The capacitance provided by transistors 420 and 425 is in parallel with resistor 415, so the net impedance between the sources of transistors M1 and M2 decreases with frequency. As a consequence, the gain of current-steering network 400 increases with frequency. In some embodiments, the resistance through resistor 415 can be adjusted to change the source-degeneration resistance, and thus to alter the extent to which the gain of network 400 increases with frequency. Ideally, the frequency response of network 400 matches the inverse of the attenuation induced by the associated channel (e.g., channel 115 of FIG. 1).

Figure 5:
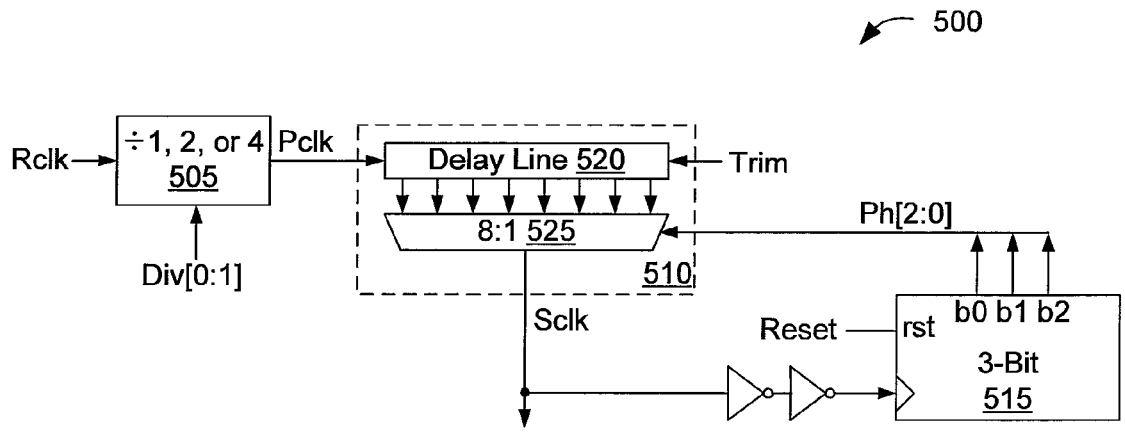
FIG. 5 depicts a phase vernier 500, an embodiment of which might be used, for example, as phase vernier 160 of FIG. 1.

FIG. 5 depicts a phase vernier 500, an embodiment of which might be used, for example, as phase vernier 160 of FIG. 1. Phase vernier 500 includes an optional clock divider 505, an adjustable delay element 510, and a three-bit up/down phase counter 515. As explained above, incoming data symbols are scanned using a recovered clock Rclk phase delayed in discrete steps to create a sample clock Sclk. Ignoring clock divider 505 for the moment, phase vernier 500 sends a form of the recovered clock through a multi-tap delay line 520. A multiplexer 525 then selects one of N (e.g., eight) taps in the delay line to produce a phase-adjusted sample-clock edge. The maximum delay through delay line 520 is e.g. one symbol time, so moving the edges of scan clock Sclk with respect to recovered clock Rclk is sure to sample the incoming signal at or near a symbol peak. The delay between taps of delay line 520 can be adjusted, in some embodiments, by application of appropriate trimming signals Trim.

Counter 515 incrementally selects each successive phase of sample clock Sclk by changing the count on bus Ph[2:0]. Counter 515 increments from 000 to 111 in Grey-code order and then returns to 000 in reverse order, thus repeatedly covering the span of phase delays afforded by delay line 520. A pair of series-connected inverters between the output of delay element 510 and the clock terminal of counter 515 ensure the most recent transition of sample clock Sclk is complete before counter 515 selects the next phase. Counter may also be adapted to count in different orders, and phase vernier 500 might include more or fewer taps, depending upon the desired sampling range and granularity. Clock divider 505 is optional, but is included here to relax the timing on the switching speed of sample clock Sclk.

As noted above, some embodiments comply with the Fibre Channel communication standard, which requires out-of-band rate negotiation to select data rates from among 1.0625 Gbps, 2.125 Gbps, and 4.25 Gbps, and allows up to twenty nanoseconds (20 ns) to detect the out-of-band signals. The amplitude detector in these embodiments therefore indicates signal loss or presence within 20 ns. In one such embodiment, the frequency of clock Rclk is divided down to form an intermediate clock signal Pclk of between 500 MHz and 1 GHz, which enables the associated amplitude monitor to identify out-of-band signals in at most sixteen nanoseconds (16 ns), which is well within the requisite twenty-nanosecond window. As examples, when receive clock Rclk is 1.0625 GHz, 2.125 GHz, and 4.25 GHz, divider 505 is set to divide recovered clock Rclk by one, two, and four, respectively.

Figure 6:
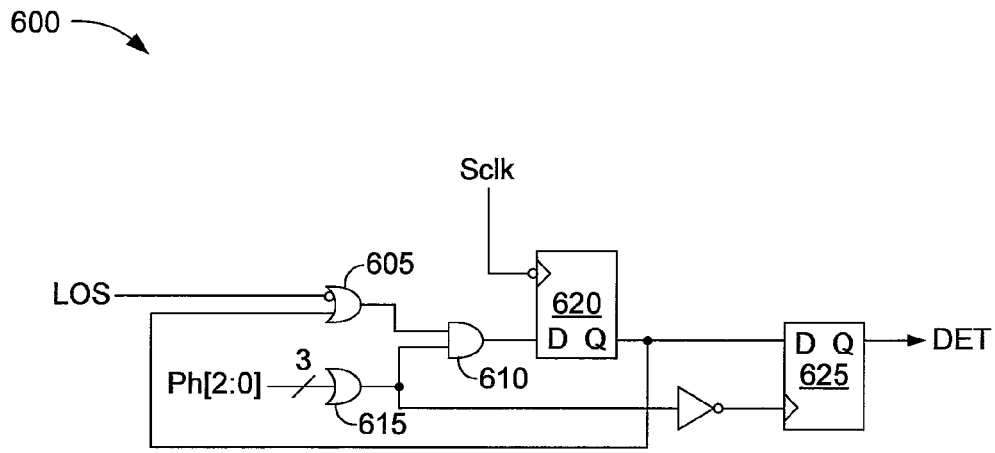
FIG. 6 depicts an LOS detector 600, an embodiment of which might be used, for example, as LOS detector 155 of FIG. 1.

FIG. 6 depicts an LOS detector 600, an embodiment of which might be used, for example, as LOS detector 155 of FIG. 1. If one or more of the eight comparisons in a complete clock scan (through all eight tap selections) produces an LOS value of zero, then the input-signal amplitude exceeded the threshold level at least once. LOS detector 155 captures such an event (i.e., a detected signal) and asserts detection signal DET for the remainder of the sample period.

LOS detector 600 includes a number of conventional logic gates 605, 610, and 615 and a pair of flip-flops 620 and 625. The three input terminals of OR gate 615 are coupled to the outputs of counter 515 of FIG. 5, so OR gate 615 enables signals to propagate through AND gate 610 unless counter 515 expresses a 000 state (i.e., Ph[2:0]=000). Thus, assuming a phase count of 000, flip-flop 620 initially captures a logic zero.

As soon as phase count Ph[2:0] transitions above zero, OR gate 615 enables AND gate 610 As long as signal LOS remains at logic one (i.e., the signal is "lost"), OR gate 605 and AND gate 610 pass a logic zero to flip-flop 620. If signal LOS goes to zero, however, flip-flop 620 captures a logic one on the next falling edge of sample clock Sclk. Due to the feedback through OR gate 605, flip-flop 620 retains the logic one until the output of OR gate 615 returns to zero. The resulting falling edge on the clock terminal of flip-flop 625 captures the value expressed by flip-flop 620 when count Ph[2:0] returns to zero, so that the output of flip-flop 625 is a logic one if any of the samples from the prior sample period produced a logic zero LOS signal.

Figure 7:
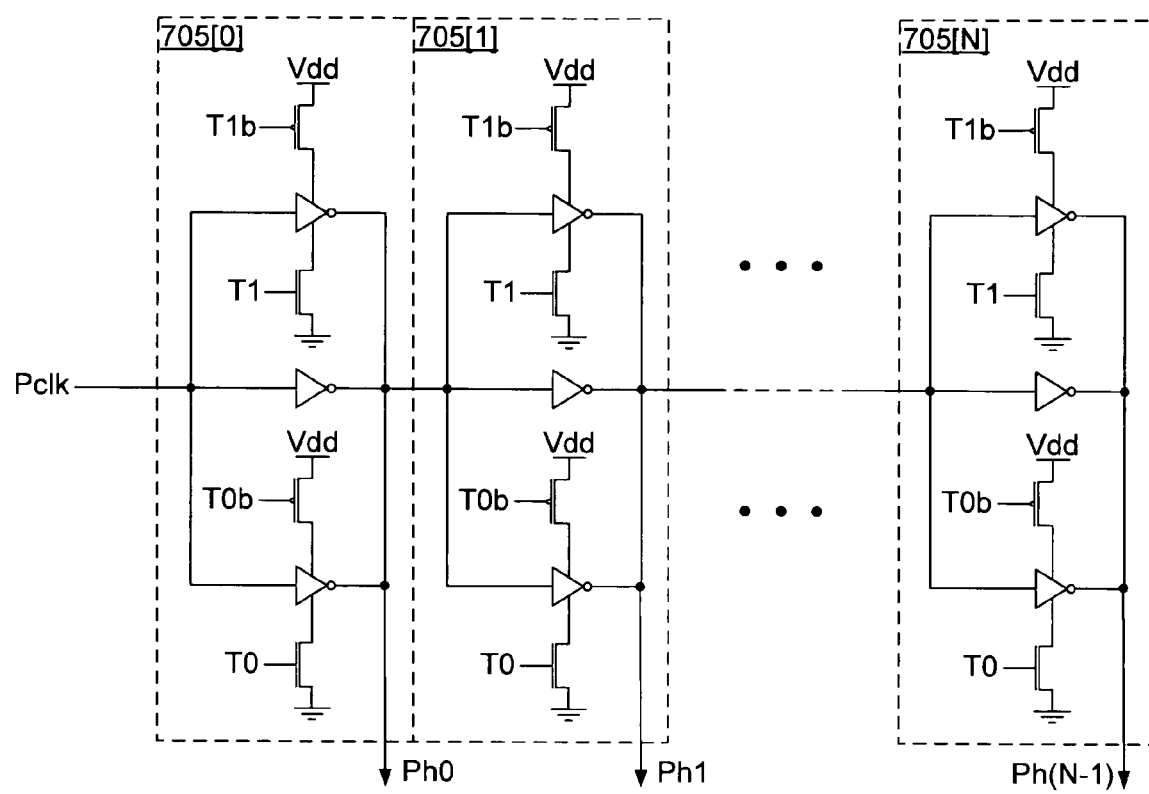
FIG. 7 depicts an N-stage delay line 700, and embodiment of which may be used, for example, as the eight-stage delay line 520 of FIG. 5.

FIG. 7 depicts an N-stage delay line 700, an embodiment of which may be used, for example, as the eight-stage delay line 520 of FIG. 5. Each of delay stages 705[0:N] includes three inverter cells, coupled in parallel, two of which are controlled by trim bits T0/T0*b* and T1/T1*b*. The trim bits may be used to establish a delay range sufficient to sweep at least one bit time in sufficiently small phase increments. Ideally, the amplitude detector samples the input signal at the peak of a signal eye. In this embodiment the phase quantization error is half the maximum step size, and is limited to one tenth of the unit interval (i.e. 0.1 TS) from the center of the data. This translates into an error of less than 5% for the sample timing closest to the signal peak, assuming the input signal has a sine-wave shape due to considerable low-pass filtering by the channel. This is a worst-case scenario for the input waveform, best case being a square wave where the amplitude of the peak is the same within a good margin around the center of the pulse.

Figure 8:
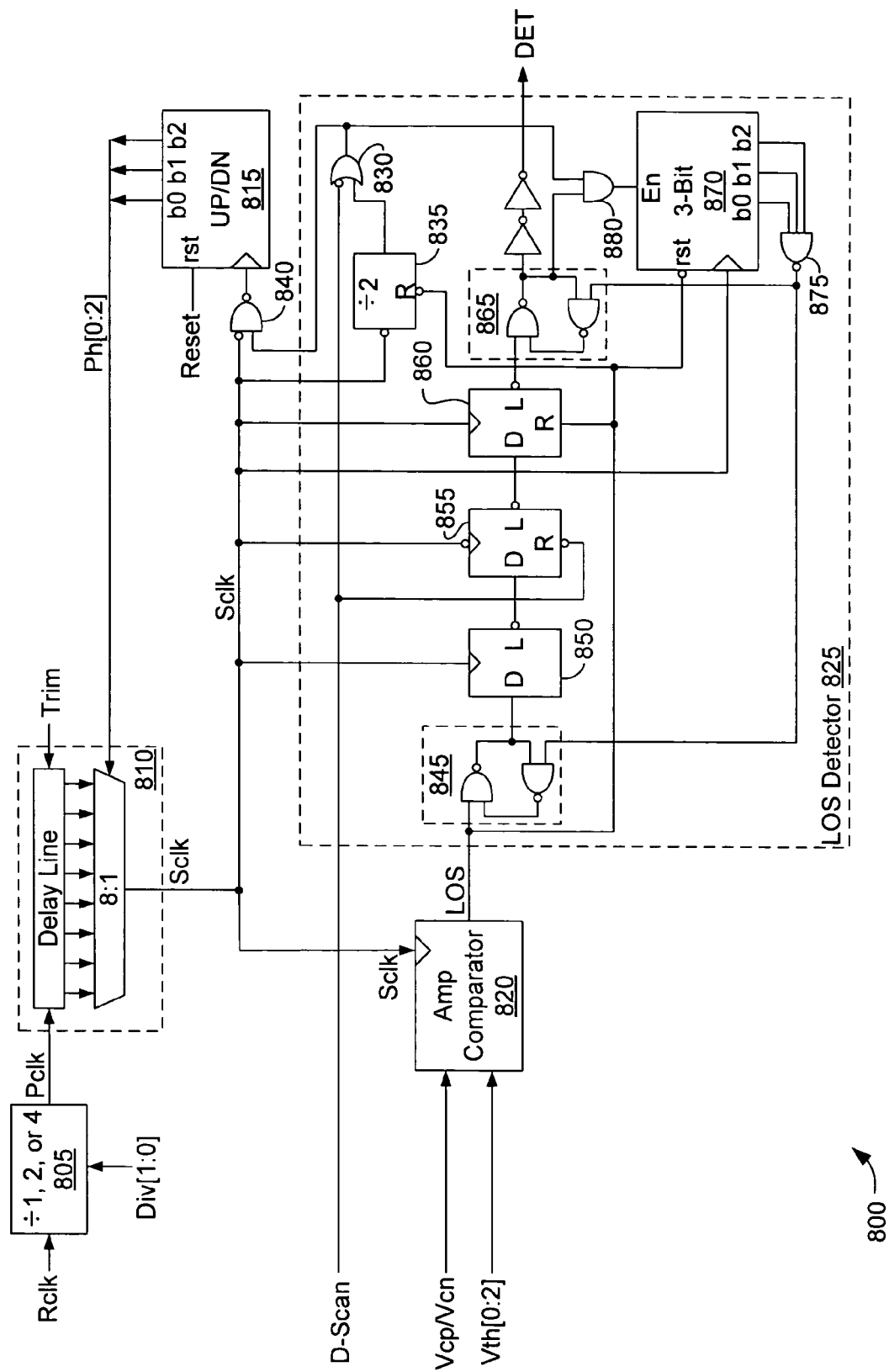
FIG. 8 depicts an amplitude monitor 800 in accordance with another embodiment.

FIG. 8 depicts an amplitude monitor 800 in accordance with another embodiment. Amplitude monitor 800 includes a selectable clock divider 805, a selectable delay line 810, a three-bit phase counter 815, and an amplitude comparator 820, embodiments of which are described above in connection with FIGS. 3, 4, and 5. Amplitude monitor 800 additionally includes a loss-of-signal (LOS) detector 825 that is more complex than LOS detector 600 of FIG. 6 and that provides added functionality and flexibility.

An embodiment of amplitude monitor 800 is used in receivers supporting Fibre Channel serial interconnection technology and capable of communicating at frequencies of 1.0625 Gbps, 2.125 Gbps, and 4.25 Gbps. A single eye scan for each sample-clock phase, as detailed above, yields suitably accurate signal detection for the lowest of these frequencies. At higher frequencies, amplitude monitor 800 may be more prone to noise-induced errors. Amplitude monitor 800 thus supports two scan modes: a single-scan mode, like the one detailed above, for use with signals less susceptible to noise-induced errors, and a double-scan mode for use with signals more susceptible to noise-induced errors. The double-scan mode improves the validity of signal detection by scanning two incoming data eyes at the same sample-clock phase relationship and only registering a detected signal (i.e., only asserting DET=1) where two consecutive samples indicate signal presence. LOS detector 825 receives a double-scan signal D-Scan, which is asserted to place amplitude monitor 800 in the double-scan mode and de-asserted to place amplitude monitor 800 in the single-scan mode.

Double-Scan Mode

The double-scan mode is selected by asserting signal D-Scan (D-Scan=1). The output of an OR gate 830 is thus determined by the output of a frequency divider 835 that divides down the frequency of sample clock Sclk by a factor of two. The divided clock traverses OR gate 830, causing an AND gate 840 to pass every other rising edge of sample clock Sclk. Counter 815 thus increments (selects the next phase) on every other rising sample-clock edge. In the double-scan mode, the LOS signal traverses a series of five latches 845, 850, 855, 860, and 865. A second three-bit counter 870 defines the sample period, which is a period of time during which is reported a loss of signal (DET=0) if signal LOS does not go low.

The depicted embodiment doubles the scan frequency in the double-scan mode to keep the maximum scan time to below sixteen nanoseconds. Clock divider 805 is therefore set to divide recovered clock Rclk by a factor of two for 4.25 Gbps communication, and by a factor of one for both the 2.125 Gbps and 1.0625 Gbps cases. A divide ratio of four is included for embodiments that support 5 Gbps and 6.25 Gbps data rates. Clock divider 805 is set a two-bit control signal Div[1:0].

When signal LOS is a logic one (i.e., no signal is detected), an AND gate 875 periodically enables latch 845, which consequently outputs a logic zero. Latches 850 and 855 pass the output of latch 845 to the D input of latch 860 on the subsequent rising and falling edges of sample clock Sclk. Latch 860 ignores its input, as the logic one LOS signal resets latch 860, which therefore provides a logic one to the subsequent latch 865. Latch 865 inverts the output of latch 860, maintaining signal-detect node DET at logic zero to indicate that no input signal has been detected. The logic zero signal DET also disables counter 870 via an AND gate 880. LOS detector 825 remains in this state pending receipt of a sampled input signal, as evinced by a transition of signal LOS to logic zero.

As detailed above, node LOS transitions to logic zero when the amplitude of a sampled input symbol exceeds the threshold voltage. No longer reset, the output of latch 860 becomes the complement of the signal applied to its input from latch 855. Latch 855 outputs the complement of the LOS signal sampled on the preceding sample-clock edge, in this case a logic zero, so the output of latch 860 remains at logic one. The logic zero LOS signal resets divider 835 to prevent phase counter 815 from altering the selected sample-clock phase. If signal LOS remains low for the subsequent sample, the output of latch 860 transitions to a logic zero. In effect, latch 860 performs and NAND function, going low only if signal LOS is zero for two consecutive sample periods. Other embodiments require more or fewer consecutive detected signals.

Latch 865 transitions to a logic one, as does signal-detect node DET, when latch 860 produces a logic zero. This state indicates the detection of an incoming signal, and enables counter 870 via AND gate 880. Counter 870 does not count, however, until signal LOS returns to logic one. Signal DET will return to logic zero only if counter 870 reaches a count of 111 before signal LOS returns to zero. In other words, signal DET will return to logic zero if no signal is detected before counter 870 reaches 111.

Single-Scan Mode

Signal D-Scan is set to logic zero in the single-scan mode. Latch 855 is therefore constantly reset and presenting a logic one to the D input of latch 860. So long as node LOS remains a logic one, latch 860 remains reset and presents a logic one to latch 865. Latch 865, in turn, provides a logic zero to signal-detect node DET and disables counter 870. Setting signal D-Scan to zero also raises the output of OR gate 830 to a logic one, which enables both counter 815 and 870 via respective gates 840 and 880.

Signal LOS goes low when an input signal is detected. As a result, counter 870 is reset to 000 and the output of latch 860 transitions to logic zero upon the next rising edge of sample clock Sclk. The output of latch 865 then transitions to logic one, both enabling counter 870 and indicating a detected input signal as a logic one on signal-detect node DET. The low LOS signal additionally resets divider 835, causing its output to remain low until signal LOS returns to one. The logic zero from divider 835 disables the clocking of phase counter 815, thus maintaining the current phase relationship between sample clock Sclk and the perceived data. This optional feature keeps the sampling point of the scan clock around the center of the input data eyes. If for any reason scan clock Sclk is not at or near the symbol peaks, signal LOS can return to logic one when data with transitions starts and re-enables counter 815 so that amplitude detector 800 begins searching again for a signal peak.

Though enabled, counter 870 remains at 000 while signal LOS remains at zero. Counter 870 begins incrementing when signal LOS returns to logic one. Latch 865 remains at logic one, indicating a detected input signal, until counter 870 reaches a count of 111. Because a logic zero LOS signal resets counter 870 to 000, counter 870 only reaches a count of 111 if LOS does not transition to logic zero over eight clock cycles. When counter 870 reaches 111, the output from latch 860 returns to zero, which indicates that the prior eight samples, each taken at different phase relationships with respected to the incoming data (if any), did not detect even one data symbol.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. In any case, whether a given signal is an active low or an active high will be evident to those of skill in the art.

An output of the design process for an integrated circuit, or a portion of an integrated circuit, may be a computer-readable medium (e.g., a magnetic tape or an optical or magnetic disk) encoded with data structures or other information defining circuitry that may be physically instantiated as an integrated circuit or portion of an integrated circuit. These data structures are commonly written in Caltech Intermediate Format (CIF) or GDSII, a proprietary binary format. Those of skill in the art of mask preparation can develop such data structures from schematic diagrams of the type detailed above.

While the present invention has been described in connection with specific embodiments, variations of these embodiments will be obvious to those of ordinary skill in the art. For example, the signal detectors described herein quickly identify data peaks by experimenting with a range of phase offsets. The correct phase offset, once known, can be shared with CDR 135 to aid in synchronizing reference clock Rclk with the incoming data. Furthermore, the receivers described above employ voltage-mode signaling, but might also be adapted to employ current-mode schemes in which signals are conveyed as modulated currents. Voltage thresholds may also be employed in the latter case by simply converting current signals to voltage for comparison with a voltage reference. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. A method of detecting an input signal on an input port of a receiver, the method comprising:
    sampling a signal parameter at a first sampler coupled to the input port at each of a number of first sample instants during a time interval covering multiple clock cycles of a recovered clock signal;
    sampling the signal parameter at a second sampler coupled to the input port at each of a number of second sample instants during the time interval according to a scan clock signal, one of the second sample instants corresponding to each first sample instant, such that when the first and second sample instants are viewed as a sequence, the second sample instants occur progressively offset in time when compared to the corresponding first sample instants; and
    indicating presence of the input signal when the signal parameter sampled by the second sampler exceeds a threshold for at least a predetermined number of second sample instants.

2. The method of claim 1, where:
    the method further comprises, when the input signal is indicated to be present, locking the recovered clock signal to the input signal.

3. The method of claim 1, implemented in one of a Fibre Channel, Serial ATA, or Serial Attached SCSI compliant system.

4. The method of claim 1, where indicating presence includes indicating presence of the input signal if the signal parameter exceeds the threshold for more than one of the number of second sample instants during the time interval.

5. The method of claim 1, where the scan clock signal has a frequency slightly different from a frequency of the recovered clock signal.

6. The method of claim 1, further comprising deriving the scan clock signal from the recovered clock signal by introducing a progressively larger phase offset for each successive one of a number of clock cycles.

7. The method of claim 1, where the scan clock signal is swept through at least sixteen second sample instants having different phase offsets with respect to the recovered clock signal.

8. The method of claim 7, where the scan clock signal is swept through the at least sixteen second sample instants having different phase offsets in a time period of no more than 16 nanoseconds.

9. The method of claim 1, applied to a differential input signal, where indicating presence includes comparing a voltage difference of the differential input signal against the threshold.

10. The method of claim 1, where indicating presence includes using a second sampler having adjustable gain, the method further comprising adjusting the gain of the second sampler in dependence upon frequency of the input signal.

11. The method of claim 1, further comprising using a clock divider to define approximate frequency of the second clock signal with respect to a reference.

12. The method of claim 11, where the reference is the recovered clock signal.

13. The method of claim 1, further comprising using a multi-bit digital signal to define the threshold, so as to permit selective definition of the threshold as one of a set of discrete voltage values.

14. The method of claim 1, where indicating presence includes indicating presence of the input signal if the signal parameter exceeds the threshold for one of the number of second sample instants during the time interval.

15. The method of claim 1, further comprising digitally controlling the scan clock signal.

16. The method of claim 15, where digitally controlling the scan clock signal includes using an N-stage delay line and a counter, where successive stages of the N-stage delay line are sequentially activated according to an output of the counter to derive the scan clock signal from the recovered clock signal.

17. The method of claim 1, where the multiple clock cycles of the recovered clock signal represents a corresponding number of unit intervals, and where there is only one second sampling instant per unit interval.

18. A receiver, comprising:
    a port to receive an input signal;
    clock recovery circuitry to generate a recovered clock signal from the input signal, the recovered clock signal providing a plurality of first sample instants during a time interval covering multiple clock cycles of the recovered clock signal;
    a first sampler coupled to sample a signal parameter exhibited at the port at the first sample instants;
    a second sampler to sample the signal parameter according to a scan clock signal, the scan clock signal providing a plurality of second sample instants during the time interval, one of the second sample instants corresponding to each first sample instant, such that when the first and second sample instants are viewed as a sequence, the second sample instants occur progressively offset in time when compared to the corresponding first sample instants; and circuitry coupled to the second sampler to detect the presence of the input signal when a signal parameter sampled by the second sampler exceeds a threshold for at least a predetermined number of the second sample instants.

19. The receiver of claim 18, where:

the second sampler is operative to sample voltage at the port at a time when the recovered clock signal is not locked; and the first sampler, at least when an input signal is detected, is operative to use the recovered clock signal to sample incoming data at the first sample instants.

20. The receiver of claim 18, embodied as a Fibre Channel, Serial ATA, or Serial Attached SCSI compliant receiver.

21. The receiver of claim 18, further comprising circuitry to create the scan clock signal from the recovered clock signal by shifting successive rising edges of the recovered clock signal to progressively later instants.

22. The receiver of claim 21, where the circuitry to create the scan clock signal sweeps the scan clock signal through at least sixteen second sample instants having different phase offsets with respect to the recovered clock signal.

23. The receiver of claim 18, applied to a differential input signal, where the first and second samplers sample differential component voltage and where the circuitry to detect the presence of the input signal compares a voltage difference of the differential input signal against the threshold.

24. The receiver of claim 18, further comprising a clock divider to programmably-define frequency of the scan clock signal relative to a reference.

25. The receiver of claim 24, where the reference is the recovered clock signal.

26. The receiver of claim 18, where the scan clock signal has a frequency which is slightly different than the recovered clock signal.

27. The receiver of claim 18, where:

the predetermined number is one; and the receiver further comprises circuitry including a digital-to-analog converter to define the threshold, so as to permit selective definition of the threshold as one of a set of discrete voltage values.

28. The receiver of claim 18, further comprising a circuit to generate the scan clock signal by digitally and incrementally adding delays to a base clock signal.

29. The receiver of claim 28, where the circuit includes an N-stage delay line and the base clock signal is dependent upon the recovered clock signal, successive stages of the N-stage delay line being digitally and sequentially activated to generate each of the plurality of second sample instants.

30. The receiver of claim 28, further comprising a counter to generate a digital control signal to control the N-stage delay line.

31. The receiver of claim 18, where the multiple clock cycles of the recovered clock signal represents a corresponding number of unit intervals, and where there is only one second sampling instant per unit interval.

32. An apparatus, comprising:

means for sampling a signal parameter of an input signal at a first sampler coupled to the input port at each of a number of first sample instants during a time interval covering multiple clock cycles of a recovered clock signal;

means for sampling the signal parameter at a second sampler coupled to the input port at each of a number of second sample instants during the time interval according to a scan clock signal, one of the second sample instants corresponding to each first sample instant, such that when the first and second sample instants are viewed as a sequence, the second sample instants occur progressively offset in time when compared to the corresponding first sample instants; and means for indicating presence of the input signal when the signal parameter sampled by the second sampler exceeds a threshold for at least a predetermined number of second sample instants.

33. The apparatus of claim 32, where the predetermined number is one.

34. The apparatus of claim 32, where the predetermined number is at least two.

35. An apparatus that detects presence of an input signal, comprising:

clock recovery circuitry to generate a recovered clock signal from the input signal, the recovered clock signal providing first clock edges;

circuitry to create a scan clock signal having second clock edges that are progressively offset in phase from the first clock edges, such that when the first and second clock edges are viewed as a sequence, the second clock edges occur progressively offset in time when compared to the corresponding first clock edges;

a sampler to sample the input signal at sample instants defined in dependence on the second clock edges; and circuitry to detect the presence of the input signal when a signal parameter sampled by the sampler exceeds a threshold for at least a predetermined number of the sample instants.

36. The apparatus of claim 35, where the predetermined number is one.

37. The apparatus of claim 35, where the predetermined number is at least two.

\* \* \* \* \*